March 23, 1943.　　E. D. PELLEGRIN ET AL　　2,314,596
HANDLE CONSTRUCTION AND MOUNTING THEREFOR
Filed Nov. 22, 1940
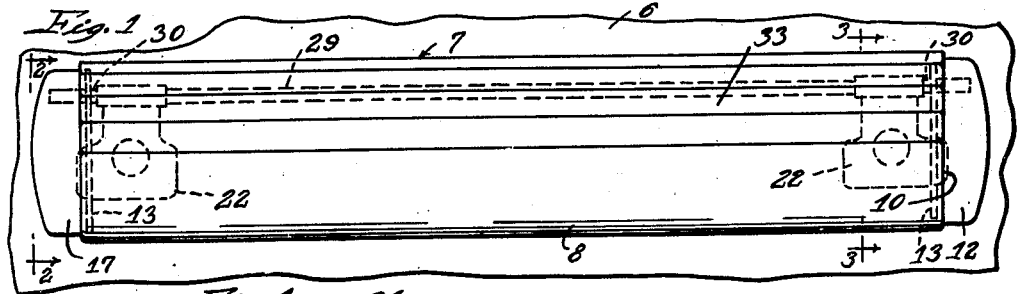
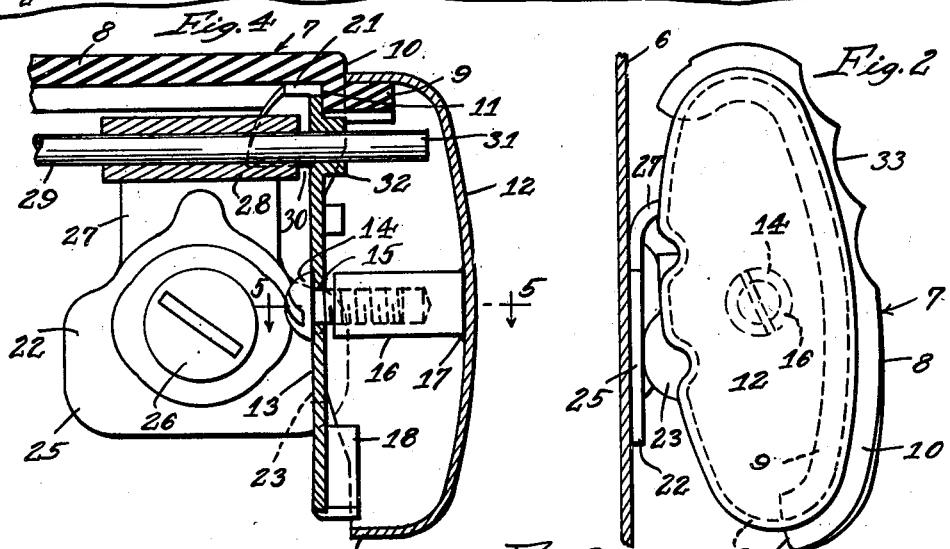
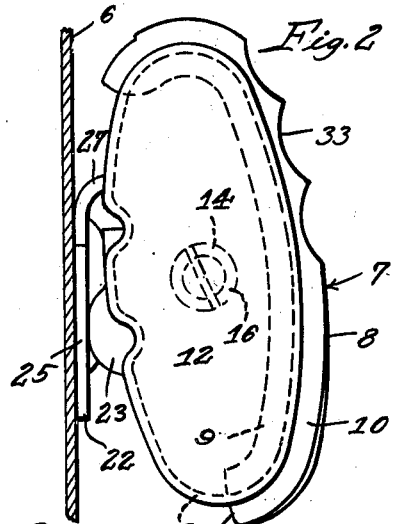
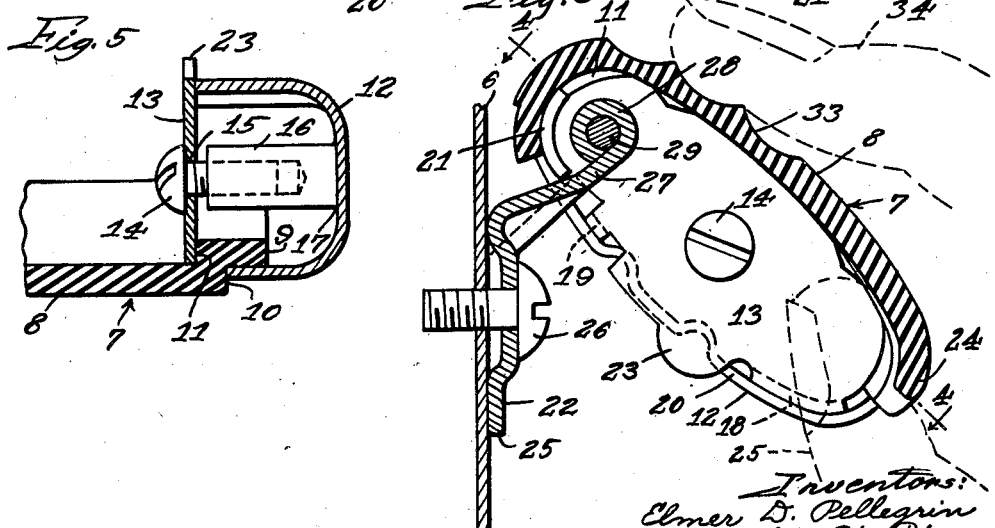
Inventors:
Elmer D. Pellegrin
& Harold H. Ring
By
McAnna, Wintercorn & Morabach
Attys.

Patented Mar. 23, 1943

2,314,596

UNITED STATES PATENT OFFICE 2,314,596

HANDLE CONSTRUCTION AND MOUNTING THEREFOR

Elmer D. Pellegrin and Harold H. Ring, Rockford, Ill., assignors to Geo. D. Roper Corporation, Rockford, Ill., a corporation of Illinois Application November 22, 1940, Serial No. 366,640

10 Claims. (Cl. 16—116)

This invention relates to an improved handle and mounting means therefor.

The handle of our invention has been particularly designed with a view to its suitability for use on domestic cooking ranges, it being important for such handles to be convenient for use, attractive in appearance, and comfortable to grasp regardless of the extent to which the adjacent parts of the range may be heated. Plastic materials, such as Plaskon and Beetle, are poor conductors and have, therefore, been used for such handles despite the fact that these materials expand when heated and have the unusual characteristic of shrinking beyond the original size upon cooling, over a period of time of successive heatings and coolings, measurements having shown that a shrinkage of $\frac{1}{8}$ of an inch in an oven door handle of average length is not unusual. As a result, plastic handles require special mountings to avoid cracking the plastic material. It is, therefore, the principal object of our invention to provide a handle of plastic material having the mounting therefor so connected to the handle that the same is free to expand and contract with temperature change and no strains which might tend to crack the handle are apt to be imposed thereon.

Another important feature of the present handle is the provision of hollow metallic caps for application to the ends of the plastic handle body, arranged to be clamped onto the handle body in a novel manner by inner clamping plates, the latter also providing bearings thereon to receive the handle hinge pin.

Still another important feature of the invention consists in the provision of hinge arms arranged to be attached to the door or drawer on the range and to extend into the opposite ends of the handle for support of the hinge pin, whereby a pendant type handle is provided, the handle normally hanging in a substantially vertical plane spaced far enough away from the range front for good air circulation between the handle and the range, so that the handle will remain relatively cool, the handle, however, being adapted to be swung on its pivots outwardly through a small angle when taken hold of by the finger tips, so that the operator's hand is not held close enough to the range front to run any risk of coming into contact with hot metal. The clamping plates in the ends of the handle have lugs thereon which engage the hinge arms to limit the outward pivotal movement, so that no appreciable strain is imposed upon the plastic material in the operation of the handle. These plates also have lugs projecting therefrom for engagement with the hinge arms to limit return movement of the handle, so that it is normally disposed with the lower edge of the plastic body spaced farther away from the range front, and hence is easier to grasp and there is less likelihood of the fingers coming in contact with any hot metal.

The invention is illustrated in the accompanying drawing, in which—

Figure 1 is a face view of a handle made in accordance with our invention as it appears when applied to an oven door or the like;

Fig. 2 is an end view of the handle on a larger scale taken on the line 2—2 of Fig. 1;

Fig. 3 is a vertical section on the same scale as Fig. 2 taken on the line 3—3 of Fig. 1, but showing the handle swung outwardly as in opening the door;

Fig. 4 is a vertical sectional detail on the line 4—4 of Fig. 3, but showing the handle in the pendant position as in Fig. 2, and Fig. 5 is a horizontal sectional detail on the line 5—5 of Fig. 4.

The same reference numerals are applied to corresponding parts throughout the views.

The wall indicated at 6 in Figs. 1, 2, and 3 may be considered the front of an oven door or drawer on a cooking range on which the handle 7 of our invention is mounted. The handle comprises a hollow elongated body 8 of molded plastic material, such as Plaskon or Beetle, the handle being substantially C-shaped in cross-section, as best appears in Figs. 2 and 3, and being of reduced size at the ends so as to define a C-shaped flange 9 on each end and an external shoulder 10 and internal shoulder 11 adjacent each of these flanges. Formed sheet metal end caps 12 have a snug telescoping fit on the flanges 9 and are drawn into tight engagement with the external shoulders 10 when generally elliptical sheet metal clamping plates 13 that are entered in the ends of the handle body 8 in abutment with the internal shoulders 11 are fastened to the caps 12 by screws 14. These screws are entered through holes 15 in the center of the clamping plates and thread in studs 16 soldered or otherwise suitably secured in the center of the caps 12, as indicated at 17. The caps 12 are suitably plated so that the handle assembly presents a neat and attractive appearance. Each of the plates 13 has outwardly struck lugs 18 and 19 fitting snugly inside the circumferentially extending flange 20 of the companion cap 12, in addition to an inwardly projecting arcuate lug 21 on the upper end of the plate having abutment with the inside of the handle body 8. The lugs 18 and 19 serve to help position the cap 12 properly, and the lug 21 helps to position the plate 13 with respect to the handle body but is also used, as will soon appear, as a limit stop to limit pivotal movement of the handle with respect to each of a pair of mounting hinge brackets 22 that support the handle on the door or drawer front. Another lug 23 is provided on the edge of each plate 13 and in the plane thereof and serves by abutment with the adjament hinge bracket 22, as will soon appear, to limit pivotal movement of the handle in the other direction, so that the handle normally hangs in a plane at an acute angle to the vertical with the lower edge 24 spaced farther away from the front of the door or drawer than would otherwise be the case, whereby to facilitate grasping the handle with the finger tips, as indicated at 25 in Fig. 3, in the opening of the door or drawer, the additional space making it less likely that the housewife will be apt to bring the fingers into contact with any hot metal on the range front.

The hinge brackets 22 are suitably formed from sheet metal to provide an attaching pad portion 25, through the embossed central portion of which a screw 26 is entered to fasten the bracket to the front wall 6 of the door or drawer. Each bracket is further formed to provide an arm 27 projecting forwardly and upwardly relative to the attaching portion 25, the free end of which is curled to provide a bearing for the hinge pin 29. The two hinge brackets 22 are so spaced inwardly with respect to the ends of the handle so that there is ample room left between the ends of the bearings 28 and the adjacent clamping plates 13, as indicated at 30 in Fig. 4, to allow for shrinkage of the plastic body 8 after the handle has been in service for some time. The pin 29 has its end portions 31 received in bearings 32 provided therefor in the clamping plates 13. The bearings 32 are suitably extruded from the sheet metal of the plates 13, as shown. The end play permitted as a result of the spacing indicated at 30 is not at all objectionable and avoids any likelihood of the handle binding or cracking. The pin 29 is so located with respect to the center of mass of the handle and there is sufficient freedom of action so that the handle when released drops of its own weight to the pendant position shown in Fig. 2. The longitudinal fluting of the plastic body 8, indicated at 33, besides improving the appearance of the handle will be found to be of advantage by some housewives as a non-skid surface whereon to rest the thumb, as indicated at 34 in Fig. 3, in the use of the handle.

The operation of the handle is believed to be obvious from the foregoing description. It is apparent that the handle supported in the manner shown will remain much cooler than the ordinary fixed type of handle, due to the fact that there is always free circulation of air all around the handle proper and very little place for the conduction of heat from the wall 6 to the handle. The heat conducted through the hinge brackets 22 to the pin 29 has little opportunity of being conducted to the handle proper, inasmuch as the pin 29 has contact with the handle only in the bearings 32 and these bearings are on the clamping plates 13 inside the handle and not at all apt to come in contact with the operator's fingers, considering the length of the handle body 8 available for the operator to grasp. The body 8, it goes without saying, does not tend to absorb or conduct heat, being of the kind of molded plastic material mentioned.

It is believed the foregoing description conveys a good understanding of the objects and advantages of our invention. The appended claims have been drawn to cover all legitimate modifications and adaptations.

We claim:

1. A device of the character described, comprising an elongated hollow handle body substantially C-shaped in cross-section and disposed with the hollow side of the C-section toward the support on which the handle is mounted, the opposite ends of said body being open and formed to provided C-shaped flanges thereon adjacent external and internal C-shaped shoulders, caps fitting over and closing the ends of said handle body on said flanges in engagement with the external shoulders, clamping plates disposed inside said handle at the opposite ends in engagement with the internal shoulders, means for securing each cap to its companion plate, and brackets arranged to be secured to a supporting member on a door or drawer and projecting into the hollow back of the handle for supporting the aforesaid handle assembly by pivotal connection with said clamping plates.

2. The device of the character described, comprising an elongated hollow handle body substantially C-shaped in cross-section and disposed with the hollow side of the C-section toward the support on which the handle is mounted, the opposite ends of said body being open and formed to provide C-shaped flanges thereon adjacent external and internal C-shaped shoulders, caps fitting over and closing the ends of said handle body on said flanges in engagement with the external shoulders, clamping plates disposed inside said handle at the opposite ends in engagement with the internal shoulders, means for securing each cap to its companion plate, a hinge pin extending lengthwise in said handle body in spaced substantially parallel relation to the longitudinal center line of the body and supported at its ends in bearings provided therefor in the clamping plates, the caps preventing endwise displacement of the pin from said bearings, and hinge brackets arranged to be secured to a supporting member on a door or drawer and having arms projecting therefrom with bearings on the ends thereof received in said handle body and pivotally supporting the handle assembly by means of the hinge pin, the handle assembly normally hanging in a substantially vertical plane in pendant relation to the arms of said brackets.

3. A device as set forth in claim 2, wherein at least one of the clamping plates has an inwardly projecting lug provided thereon adjacent the bearing for said pin and arranged to engage the arm on the adjacent hinge bracket to limit outward pivotal movement of the handle assembly from pendant position.

4. A device as set forth in claim 2, wherein at least one of the clamping plates has a projection on that edge thereof toward the adjacent hinge bracket for engagement with a portion of said bracket at a point in radially spaced relation to the hinge pin, whereby to cause the handle assembly in pendant position to lie in a plane at an acute angle to the vertical with the lower longitudinal edge portion of the handle body disposed farther from the hinge brackets, said lower longitudinal edge portion constituting the grasping portion of the handle.

5. A device as set forth in claim 2, wherein the caps are of dished substantially elliptical shape to conform to the ends of the handle body and the clamping plates are also substantially elliptical shape to conform to the ends of the handle body, each clamping plate having one or more outwardly projecting lugs on that edge thereof spaced from the handle body arranged to engage the inner side of the adjacent peripheral wall of the cap, whereby to center the cap with relation to the plate and hold the cap in centered relation with the end of the handle body.

6. A device of the character described, comprising an elongated handle member, caps removably engaged over the ends of said handle member, clamping plates set into the ends of said handle member adjacent the caps, means for securing each of said caps to its companion plate to prevent removal of the caps from the handle member, and bracket means for supporting said handle member connected with said clamping plates.

7. A device of the character described, comprising an elongated hollow handle body substantially C-shaped in cross-section and disposed with the hollow side of the C-section toward the support on which the handle is mounted, the opposite ends of said body being open and formed to provide C-shaped flanges thereon adjacent external and internal C-shaped shoulders, caps fitting over and closing the ends of said handle body on said flanges in engagement with the external shoulders, clamping plates disposed inside said handle at the opposite ends in engagement with the internal shoulders, means for securing each cap to its companion plate, and bracket means for supporting said handle body connected with said clamping plates.

8. A device of the character described, comprising an elongated handle member, caps removably engaged over the ends of said handle member, clamping plates set into the ends of said handle member adjacent the caps, means for securing each of said caps to its companion plate to prevent removal of the caps from the handle member, a hinge pin extending lengthwise in said handle member in spaced substantially parallel relation to the longitudinal center line thereof and supported at its ends in bearings provided therefor in the clamping plates, the caps when secured to said plates preventing endwise displacement of the pin from the handle member, and bracket means for supporting the handle member having arms pivotally connected to the handle assembly by means of the hinge pin, the handle assembly normally hanging in a substantially vertical plane in pendant relation to the arms of said bracket means.

9. A device as set forth in claim 8, wherein at least one of the clamping plates has an inwardly projecting lug provided thereon adjacent the bearing for said pin and arranged to engage the adjacent arm of the bracket means to limit outward pivotal movement of the handle assembly from pendant position.

10. A device as set forth in claim 8, wherein at least one of the clamping plates has a projection on that edge thereof toward the bracket means for engagement therewith at a point in radially spaced relation to the hinge pin, whereby to cause the handle assembly in pendant position to lie in a plane at an acute angle to the vertical with the lower longitudinal edge portion of the handle member disposed farther from the hinge brackets, said lower longitudinal edge portion constituting the grasping portion of the handle.

ELMER D. PELLEGRIN.
HAROLD H. RING.